US012598421B2

(12) United States Patent
Park et al.

(10) Patent No.: US 12,598,421 B2
(45) Date of Patent: Apr. 7, 2026

(54) ELECTRONIC DEVICE AND CONTROLLING METHOD OF ELECTRONIC DEVICE

(71) Applicant: SAMSUNG ELECTRONICS CO., LTD., Suwon-si (KR)

(72) Inventors: Kwangbok Park, Suwon-si (KR); Duckjo Son, Suwon-si (KR); Changjun Lee, Suwon-si (KR); Yongjoon Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 160 days.

(21) Appl. No.: 18/653,069

(22) Filed: May 2, 2024

(65) Prior Publication Data

US 2024/0284101 A1 Aug. 22, 2024

Related U.S. Application Data

(63) Continuation of application No. PCT/KR2022/019652, filed on Dec. 6, 2022.

(30) Foreign Application Priority Data

Jan. 13, 2022 (KR) ......................... 10-2022-0005412

(51) Int. Cl.
*H04R 3/04* (2006.01)
*G06F 3/16* (2006.01)

(52) U.S. Cl.
CPC ............... *H04R 3/04* (2013.01); *G06F 3/165* (2013.01)

(58) Field of Classification Search
CPC .................................. H04R 3/04; G06F 3/165
See application file for complete search history.

(56) References Cited

U.S. PATENT DOCUMENTS 10,158,960 B1 * 12/2018 Møller ..................... H04R 5/02
10,355,658 B1 7/2019 Yang
(Continued)

FOREIGN PATENT DOCUMENTS

JP 2017028397 A 2/2017
JP 2018160885 A 10/2018
(Continued)

OTHER PUBLICATIONS

International Search Report for PCT/KR2022/019652 mailed Mar. 22, 2023, 4 pages.
(Continued)

*Primary Examiner* — Andrew Sniezek
(74) *Attorney, Agent, or Firm* — Nixon & Vanderhye, P.C.

(57) ABSTRACT

Disclosed is an electronic device. The electronic device comprises: a speaker; a memory in which filter information for each of a plurality of volume levels is stored for each of characteristic values of a plurality of speakers; and at least one processor, comprising processing circuitry, individually and/or collectively, configured to: obtain filter information for each of the plurality of volume levels corresponding to the characteristic values of the speaker among stored filter information based on characteristic values of the speaker, set a filter based on filter information corresponding to a volume level of the electronic device among the obtained filter information, perform signal processing on an audio signal using the set filter, and control the speaker to output the processed audio signal.

20 Claims, 11 Drawing Sheets

(56)        References Cited

U.S. PATENT DOCUMENTS

| | | | |
|---|---|---|---|
| 10,873,306 B2 | 12/2020 | Hwang | |
| 11,190,875 B2 | 11/2021 | Jeong | |
| 2006/0159283 A1 | 7/2006 | Mathew | |
| 2011/0026717 A1 | 2/2011 | Nakagawa | |
| 2013/0148821 A1 | 6/2013 | Sorensen | |
| 2014/0135076 A1 | 5/2014 | Lee | |
| 2017/0077887 A1 | 3/2017 | You | |
| 2020/0348902 A1* | 11/2020 | Park | H04R 3/12 |
| 2021/0076132 A1 | 3/2021 | Postel | |

FOREIGN PATENT DOCUMENTS

| | | |
|---|---|---|
| KR | 20050107931 A | 11/2005 |
| KR | 100619066 B1 | 8/2006 |
| KR | 20140072927 A | 6/2014 |
| KR | 20180087782 A | 8/2018 |
| KR | 20190056486 A | 5/2019 |
| KR | 102048739 B1 | 11/2019 |
| KR | 20210052124 A | 5/2021 |

OTHER PUBLICATIONS

Written Opinion of the ISA for PCT/KR2022/019652 mailed Mar. 22, 2023, 4 pages.

* cited by examiner

FIG. 4

LTC PARAMETER
0X000000A3

| VOL LEVEL | b0 | b1 | b2 | a1 | a2 |
|---|---|---|---|---|---|
| 50 | 0.998004 | −1.951778 | 0.954733 | −1.951688 | 0.952827 |
| 51 | 0.997804 | −1.951578 | 0.954725 | −1.951479 | 0.952628 |
| 52 | 0.997605 | −1.951377 | 0.954715 | −1.951269 | 0.952428 |
| 53 | 0.997405 | −1.951176 | 0.954705 | −1.951058 | 0.952228 |
| 54 | 0.997205 | −1.950973 | 0.954694 | −1.950847 | 0.952026 |
| 55 | 0.997006 | −1.950770 | 0.954682 | −1.950634 | 0.951823 |
| ... | ... | ... | ... | ... | ... |
| 99 | 0.988157 | −1.940867 | 0.953335 | −1.940314 | 0.942045 |
| 100 | 0.987953 | −1.940619 | 0.953286 | −1.940056 | 0.941801 |

FIG. 5

| | Para #3 | | Para #2 | | Para #1 |
|---|---|---|---|---|---|
| Index | Fc | Gain | Fc | Gain | MINIMUM VOLUME LEVEL |
| 0 | – | – | – | – | 100, Bypass |
| 1 | 350 | −0.1 | 100 | −0.15 | 40 |
| 2 | 350 | −0.15 | 100 | −0.2 | 45 |
| 3 | 350 | −0.2 | 150 | −0.1 | 50 |
| 4 | 400 | −0.1 | 150 | −0.15 | 55 |
| 5 | 400 | −0.15 | 150 | −0.2 | 60 |
| 6 | 400 | −0.2 | 200 | −0.1 | 65 |
| 7 | 450 | −0.1 | 200 | −0.15 | 70 |
| 8 | 450 | −0.15 | 200 | −0.2 | – |
| 9 | 450 | −0.2 | 250 | −0.1 | – |
| 10(A) | 500 | −0.1 | 250 | −0.15 | – |
| 11(B) | 500 | −0.15 | 250 | −0.2 | – |
| 12(C) | 500 | −0.2 | 300 | −0.1 | – |
| 13(D) | 600 | −0.15 | 300 | −0.15 | – |
| 14(E) | 600 | −0.2 | 300 | −0.2 | – |
| 15(F) | – | – | – | – | – |

<u>100</u>

ELECTRONIC DEVICE AND CONTROLLING METHOD OF ELECTRONIC DEVICE

CROSS-REFERENCE TO RELATED APPLICATIONS

This application is a continuation of International Application No. PCT/KR2022/019652 designating the United States, filed on Dec. 6, 2022, in the Korean Intellectual Property Receiving Office and claiming priority to Korean Patent Application No. 10-2022-0005412, filed on Jan. 13, 2022, in the Korean Intellectual Property Office, the disclosures of each of which are incorporated by reference herein in their entireties.

BACKGROUND

Field

The disclosure relates to an electronic device and a controlling method of the electronic device, and for example, to an electronic device that performs signal processing on an audio signal using a filter set based on a characteristic value of a speaker, and a controlling method of the electronic device.

Description of Related Art

Recently, as sizes and thickness of display devices such as TVs, monitors, and tablet PCs have become diverse, there is a trend that types and sizes of speakers included in display devices are also becoming diverse.

Meanwhile, in the case of a small speaker, due to the limitation on the size of a driver, in case an audio signal greater than or equal to a specific size is output in a low-pitched range, a distorted audio signal wherein degradation of the sound quality occurred may be output.

Accordingly, in the past, for preventing/reducing distortion of the sound quality, a digital signal processor (DSP) of a display device was performing signal processing that reduces the size of a low-pitched range of an audio signal.

Meanwhile, specifications of speakers included in display devices may be diverse for each model of display devices, but a DSP performs signal processing on all models by the same method. Accordingly, a problem that in a model including a speaker having a low performance, distortion of the sound quality still occurs even if signal processing is performed, and in a model including a speaker having a high performance, the performance of the speaker cannot be exerted fully may occur.

Accordingly, in the case of performing signal processing on an audio signal for preventing/reducing distortion of the sound quality, it is an important matter that the signal processing is performed in consideration of the characteristic of the speaker.

SUMMARY

An electronic device according to an example embodiment of the disclosure includes: a speaker, a memory in which filter information for each of a plurality of volume levels is stored for each of characteristic values of a plurality of speakers, and at least one processor, comprising processing circuitry, individually and/or collectively, configured to: obtain filter information for each of the plurality of volume levels corresponding to the characteristic values of the speaker among the stored filter information based on the characteristic values of the speaker, set a filter based on filter information corresponding to a volume level of the electronic device among the obtained filter information, perform signal processing on an audio signal using the set filter, and control the speaker to output the processed audio signal.

At least one processor may, based on the volume level of the electronic device being greater than or equal to a specified level, individually and/or collectively, be configured to control the electronic device to: output the processed audio signal through the speaker, and based on the volume level of the electronic device being greater than the specified level, output the audio signal through the speaker without signal processing using the filter.

The characteristic values of the speaker may include index values for each of a plurality of parameters, and the index values for each of the parameters may be determined based on the characteristics of the speaker.

The plurality of parameters may include: a parameter for a range of the plurality of volume levels corresponding to the filter information, a parameter for a benefit of the filter, and a parameter for a block frequency of the filter.

The filter may include a low-cut shelving filter.

A size of a negative benefit of the low-cut shelving filter may decrease by a specified value as the volume level of the electronic device gradually decreases.

The filter information for each of the plurality of volume levels may include information on filter coefficients corresponding to each of the volume levels.

A method of controlling an electronic device including a speaker according to an example embodiment of the disclosure may include: based on characteristic values of the speaker, obtaining filter information for each of a plurality of volume levels corresponding to the characteristic values among filter information for each of a plurality of volume levels for each of characteristic values of a plurality of speakers, setting a filter based on filter information corresponding to a volume level of the electronic device among the obtained filter information, performing signal processing on an audio signal using the set filter, and outputting the processed audio signal through the speaker.

In the outputting, based on the volume level of the electronic device being greater than or equal to a specified level, the processed audio signal may be output through the speaker, and based on the volume level of the electronic device being greater than the specified level, the audio signal may be output through the speaker without signal processing using the filter.

The characteristic values of the speaker may include index values for each of a plurality of parameters, and the index values for each of the parameters may be determined based on the characteristics of the speaker.

The plurality of parameters may include: a parameter for a range of the plurality of volume levels corresponding to the filter information, a parameter for a benefit of the filter, and a parameter for a block frequency of the filter.

The filter may include a low-cut shelving filter.

A size of a negative benefit of the low-cut shelving filter may decrease by a predetermined value as the volume level of the electronic device gradually decreases.

The filter information for each of the plurality of volume levels may include information on filter coefficients corresponding to each of the volume levels.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 4 is a diagram illustrating filter information corresponding to characteristic values of a speaker according to various embodiments;

FIG. 5 is a diagram illustrating a relation between parameters of characteristic values of a speaker and a filter according to various embodiments;

DETAILED DESCRIPTION

Figure 1:
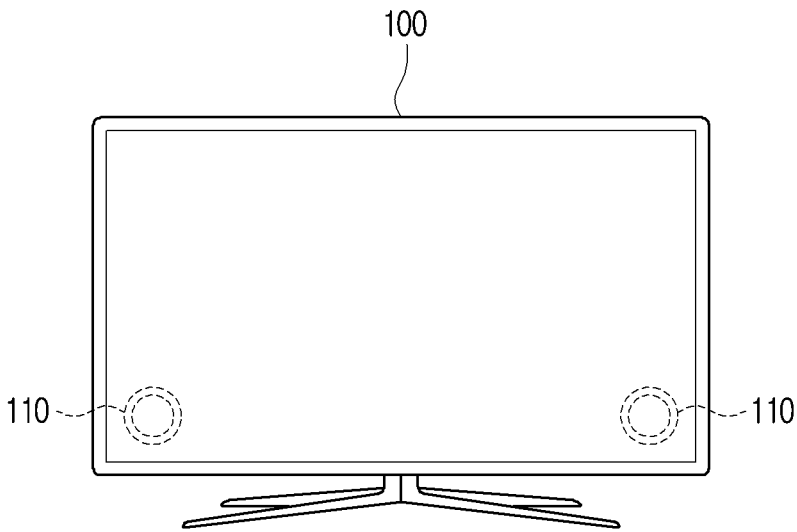
FIG. 1 is a diagram illustrating an example electronic device according to various embodiments.

Various modifications may be made to the various example embodiments of the disclosure, and there may be various types of embodiments. Accordingly, various embodiments will be illustrated in drawings, and the various example embodiments will be described in greater detail in the detailed description. However, it should be noted that the various embodiments are not intended to limit the scope of the disclosure to a specific embodiment, but they should be interpreted to include all modifications, equivalents, and/or alternatives of the various embodiments of the disclosure. Meanwhile, with respect to the detailed description of the drawings, similar components may be designated by similar reference numerals.

In describing the disclosure, in case it is determined that detailed explanation of related known functions or features may unnecessarily confuse the gist of the disclosure, the detailed explanation may be omitted.

The various embodiments below may be modified in various different forms, and the scope of the technical idea of the disclosure is not limited to the various example embodiments below. Rather, these embodiments are provided to make the disclosure more sufficient and complete, and to fully convey the technical idea of the disclosure to those skilled in the art.

The terms used in the disclosure are simply used to explain various embodiments, and are not intended to limit the scope of the disclosure. In addition, singular expressions include plural expressions, unless defined differently in the context.

In the disclosure, expressions such as "have," "may have," "include," and "may include" denote the existence of such characteristics (e.g.: elements such as numbers, functions, operations, and components), and do not exclude the existence of additional characteristics.

In the disclosure, the expressions "A or B," "at least one of A and/or B," or "one or more of A and/or B" and the like may include all possible combinations of the listed items. For example, "A or B," "at least one of A and B," or "at least one of A or B" may refer to all of the following cases: (1) including at least one A, (2) including at least one B, or (3) including at least one A and at least one B.

The expressions "first," "second," and the like used in the disclosure may describe various elements regardless of any order and/or degree of importance. Also, such expressions are used only to distinguish one element from another element, and are not intended to limit the elements.

The description in the disclosure that one element (e.g.: a first element) is "(operatively or communicatively) coupled with/to" or "connected to" another element (e.g.: a second element) should be interpreted to include both the case where the one element is directly coupled to the another element, and the case where the one element is coupled to the another element through still another element (e.g.: a third element).

The description that one element (e.g.: a first element) is "directly coupled" or "directly connected" to another element (e.g.: a second element) can be interpreted so that still another element (e.g.: a third element) does not exist between the one element and the another element.

The expression "configured to" used in the disclosure may be interchangeably used with other expressions such as "suitable for," "having the capacity to," "designed to," "adapted to," "made to," and "capable of," depending on cases. Meanwhile, the term "configured to" may not necessarily refer to a device being "specifically designed to" in terms of hardware.

Under some circumstances, the expression "a device configured to" may refer, for example, to the device "is capable of" performing an operation together with another device or component. For example, the phrase "a processor configured to perform A, B, and C" may refer, for example, to a dedicated processor (e.g.: an embedded processor) for performing the corresponding operations, or a generic-purpose processor (e.g.: a CPU or an application processor) that can perform the corresponding operations by executing one or more software programs stored in a memory device.

Further, in various embodiments of the disclosure, 'a module' or 'a part' may perform at least one function or operation, and may be implemented as hardware or software, or as a combination of hardware and software. A plurality of 'modules' or 'parts' may be integrated into at least one module and implemented as at least one processor, excluding 'a module' or 'a part' that needs to be implemented as specific hardware.

Various elements and areas in the drawings were illustrated schematically. Accordingly, the technical idea of the disclosure is not limited by the relative sizes or intervals illustrated in the accompanying drawings.

Hereinafter, various embodiments according to the disclosure will be described in greater detail with reference to the accompanying drawings.

FIG. 1 is a diagram illustrating an example electronic device according to various embodiments.

The electronic device 100 may include various devices that can output an audio signal such as, for example, and without limitation, a TV, a monitor, a smartphone, a tablet, etc.

The electronic device 100 may include speakers 110. Accordingly, the electronic device 100 may output audio signals through the speakers 110.

According to the characteristics of the speakers 110, audio signals that can be output by the speakers 110 may be limited. For example, according to the characteristics of the speakers 110, frequency bands of audio signals that can be output by the speakers 110 or sizes of audio signals for each frequency band may be limited.

The characteristics of the speakers 110 may refer, for example, and without limitation, to the locations of the speakers 110 mounted on the electronic device 100, the number of the speakers 110, outputs of the speakers 110, and the specifications of drivers (e.g., the types of drivers, the number of drivers, the sizes of drivers, the thicknesses of drivers), etc. included in the speakers 110.

In case an audio signal that is beyond a range of an audio signal that can be output by the speaker 110 is output through the speaker 110, the output signal may be an audio signal of which sound quality has been distorted wherein degradation of the sound quality occurs in a specific frequency band.

Accordingly, for preventing and/or reducing output of a distorted audio signal of which sound quality has been distorted through the speaker 110, signal processing on an audio signal may be performed before the audio signal is output through the speaker 110.

In case audio signal processing is performed regardless of the characteristics of the speaker 110, an audio signal on which the signal processing was performed may still be beyond the range of an audio signal that can be output by the speaker 110.

If audio signal processing is performed regardless of characteristics of the speaker 110, signal processing may also be performed on an audio signal which does not actually need signal processing.

Accordingly, an electronic device 100 according to an embodiment of the disclosure may set a filter based on the characteristic values of the speaker 110 that are determined according to the characteristics of the speaker 110, and perform signal processing on an audio signal using the set filter.

As described above, the electronic device 100 according to an embodiment of the disclosure can perform signal processing on an audio signal by setting a filter differently for each characteristic of the speaker 110, and thus an audio signal which has an optimized sound quality for which the performance of the speaker 110 has been exerted fully, and at the same time, wherein there is little or no distortion of the sound quality can be output through the speaker 110.

Figure 2:
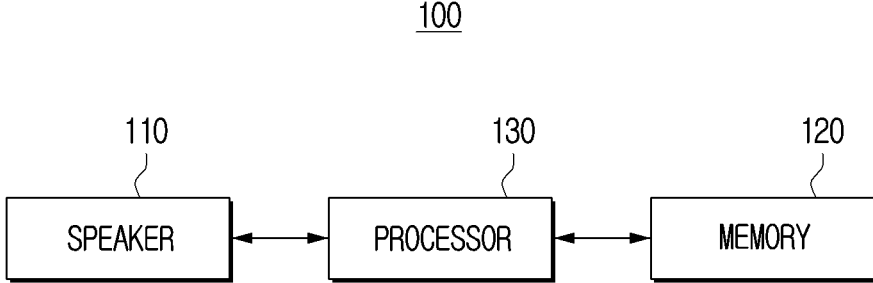
FIG. 2 is a block diagram illustrating an example configuration of an electronic device according to various embodiments.

FIG. 2 is a block diagram illustrating an example configuration of an electronic device according to various embodiments.

The speaker 110 is a component for outputting an audio signal. The speaker 110 may include a driver (or, a unit), an enclosure, and a cross-over network, etc.

In the memory 120, data for operations of the electronic device 100 may be stored. For example, in the memory 120, filter information for each of a plurality of volume levels may be stored for each of the characteristic values of the plurality of speakers 110, and detailed explanation in this regard will be described in greater detail below.

In the memory 120, at least one instruction regarding the electronic device 100 may be stored. In addition, in the memory 120, an operating system (O/S) for driving the electronic device 100 may be stored. Further, in the memory 120, various kinds of software programs or applications for the electronic device 100 to operate according to the various embodiments of the disclosure may be stored. For this, the memory 120 may include a volatile memory, a semiconductor memory such as a flash memory, etc., or a magnetic storage medium such as a hard disk, etc.

The processor 130 may be electrically connected with the speaker 110 and the memory 120, may include various processing circuitry and control the overall operations and functions of the electronic device 100.

The processor 130 may include a central processing unit (CPU) or an application processor (AP), and may execute one or more software programs stored in the memory 120 according to one or more instructions stored in the memory 120 of the electronic device 100. The processor 130 according to an embodiment of the disclosure may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

The processor 130 may obtain filter information for each of the plurality of volume levels corresponding to the characteristic values of the speaker 110 among the filter information stored based on the characteristic values of the speaker 110.

The characteristic values of the speaker 110 may include a plurality of tuning parameter values in consideration of the characteristics of the speaker 110. Specifically, the characteristic values of the speaker 110 may include index values for each of a plurality of parameters, and the index values for each of the parameters may be determined based on the characteristics of the speaker 110.

Figure 3:
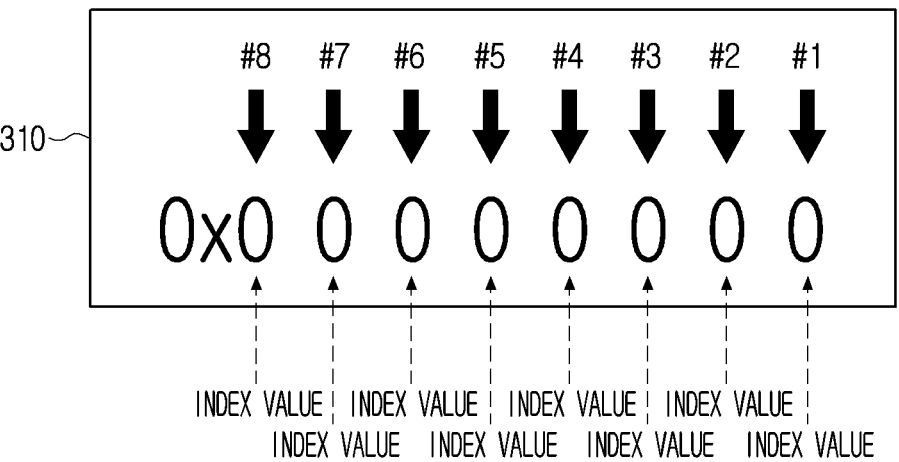
FIG. 3 is a diagram illustrating characteristic values of a speaker according to various embodiments.

For example, as illustrated in FIG. 3, the characteristic values of the speaker 110 may be stored in the memory as an INT type, and may include a characteristic value 310 in an 8 byte form. In this case, the characteristic value 310 of 8 bytes may include eight parameters in total from a first parameter to an eighth parameter. Also, each of the eight parameters may include an index value including a hexadecimal number. In this case, each of the eight index values may have 16 values in total from 0 to 15 (F), and also, each of the eight index values may be a value determined in advance according to the characteristics of the speaker 110.

As an example, in case the characteristic of the speaker 110 is an A type (the driver size is greater than or equal to x1 and smaller than x2, the thickness of the driver is greater than or equal to y1 and smaller than y2, etc.), the characteristic value may be '0x00000015.' Also, in case the characteristic of the speaker 110 is a B type (the driver size is greater than or equal to x2 and smaller than x3, the thickness of the driver is greater than or equal to y2 and smaller than y3, etc.), the characteristic value may be '0x05400242.' Further, in case the characteristic of the speaker 110 is a C type (the driver size is greater than or equal to x3 and smaller than x4, the thickness of the driver is greater than or equal to y3 and smaller than y4, etc.), the characteristic value may be '0xDA06C19F.' As can be seen above, the characteristic values of the speaker 110 may have values of 8 bytes determined in advance according to the characteristics of the speaker 110.

However, this is merely an example, and the characteristic values of the speaker 110 do not necessarily have to be characteristic values of 8 bytes. That is, the characteristic values of the speaker 110 may include data in various forms that can be determined according to the characteristics of the speaker 110.

The characteristic values of the speaker 110 may be stored in the memory 120. For example, the characteristic values of the speaker 110 may be stored in the memory 120 in the manufacturing step of the electronic device 100, or set from the user and stored in the memory 120. Also, the characteristic values of the speaker 110 may be received from an external device or another processor.

The processor 130 may obtain filter information for each of the plurality of volume levels corresponding to the characteristic values of the speaker 110 among the filter information for each of the plurality of volume levels, for each of the characteristic values of the plurality of speakers 110 stored in the memory 120 based on the characteristic values of the speaker 110.

The filter information stored in the memory 120 may include information on filter coefficients for each of the plurality of volume levels for each of the characteristic values of the plurality of speakers 110. In this case, the information on the filter coefficients may be stored in the form of a lookup table for each of the plurality of volume levels.

The filter coefficients may be information necessary for designing a filter that satisfies a specific specification. Such filter coefficients may be used in designing a filter in various filter design programs, algorithms, and filter design functions, etc.

For example, as illustrated in FIG. 4, in the memory 120, a lookup table of IIR filter coefficients for each volume level from volume levels 50 to 100 of the characteristic value '0x000000A3' of the speaker 110 may be stored.

In this case, the IIR filter coefficients for each volume level from the volume levels 50 to 100 may include values of each of b0, b1, b2, a1, and a2 which are coefficients of a filter for implementing a secondary IIR filter in a direct form 1.

For example, if the characteristic value of the speaker 110 is '0x000000A3,' the secondary IIR filter coefficients (b0, b1, b2, a1, a2) may be (0.998004, −1.951778, −0.954733, −1.951688, 0.952827) if the volume level is 50, and may be (0.997804, −1.951578, 0.954725, 1.951479, 0.952628) if the volume level is 51, and may be (0.997605, −1.951377, 0.954715, −1.951269, 0.952428) if the volume level is 53.

However, this is merely an example, and the filter information for each of the plurality of volume levels does not necessarily have to be the secondary IIR filter coefficients. That is, in the filter information for each of the plurality of volume levels, various forms of data for designing a filter according to the specification of the filter to be designed, the type of the filter, the filter function, etc. can be included.

A filter designed based on the filter information for each of the plurality of volume levels corresponding to the characteristic values of the speaker 110 may be used in signal processing that increases or decreases the size of an audio signal of a specific frequency band.

In this case, the filter designed based on the filter information for each of the plurality of volume levels corresponding to the characteristic values of the speaker 110 may be a filter that makes a difference in sizes of a signal before and after signal processing is performed reduced, and also makes the audio signal on which signal processing was performed included in the range of an audio signal that can be output by the speaker 110.

Accordingly, in case an audio signal on which signal processing was performed by the filter is output through the speaker 110, an audio signal which has a sound quality optimized for the volume levels of the electronic device 100, and at the same time, wherein distortion of the sound quality does not occur in the plurality of volume levels may be output.

The filter may include a low-cut shelving filter. The low-cut shelving filter may refer, for example, to a filter wherein a frequency band lower than a block frequency has a negative benefit, and a frequency band higher than or equal to the block frequency has a benefit of 1.

Accordingly, in the case of an audio signal on which signal processing was performed by the low-cut shelving filter, the size of an audio signal of a frequency band lower than the block frequency may decrease as much as the negative benefit, and an audio signal of a frequency band higher than or equal to the block frequency may have the same size as the size before the signal processing was performed.

The size of the negative benefit of the low-cut shelving filter may decrease by a predetermined (e.g., specified) value as the volume level gradually decreases.

For example, it is assumed that the size of the negative benefit of the low-cut shelving filter decreases by 0.15 dBSPL every time as the volume level gradually decreases.

In this case, if the volume level is 100, the size of the negative benefit of the low-cut shelving filter may be −6 dBSPL, and if the volume level is 99, the size of the negative benefit of the low-cut shelving filter may be −5.85 dBSPL, and if the volume level is 98, the size of the negative benefit of the low-cut shelving filter may be −5.7 dBSPL.

The low-cut shelving filter of the aforementioned example was explained by assuming it as an ideal filter. For example, the low-cut shelving filter that can be actually implemented is not an ideal filter, and thus roll-offs and ripples, etc. can be included.

The filter may include various filters for performing signal processing such as a low pass filter, a high pass filter, a band pass filter, and a band stop filter, etc. other than the low-cut shelving filter.

The plurality of parameters of the characteristic values of the speaker 110 may include a parameter for a range of the plurality of volume levels of the filter corresponding to the characteristic values of the speaker 110, a parameter for a benefit of the filter corresponding to the characteristic values of the speaker 110, and a parameter for a block frequency of the filter corresponding to the characteristic values of the speaker 110.

For example, the characteristic values of the speaker 110 may include an index value of a parameter for a range of a plurality of volume levels, and the index value may be a value corresponding to a range of volume levels wherein signal processing can be performed through a filter designed based on the filter information corresponding to the characteristic values of the speaker 110.

The characteristic values of the speaker 110 may include an index value of a parameter for a benefit of a filter, and the value may be a value corresponding to a benefit of a filter designed based on the filter information corresponding to the characteristic values of the speaker 110.

The characteristic values of the speaker 110 may include an index value of a parameter for a block frequency of a filter, and the value may be a value corresponding to a block frequency of a plurality of filters designed based on the filter information corresponding to the characteristic values of the speaker 110.

For example, as illustrated in FIG. 3, a case wherein the characteristic values of the speaker 110 have values of 8 bytes including eight parameters in total from the first parameter to the eighth parameter is assumed.

In this case, referring to FIG. 5, an index value of the first parameter among the eight parameters may be a value corresponding to the minimum volume level among the plurality of volume levels of the filter information corresponding to the characteristic values, and an index value of the second parameter or the third parameter may be a value corresponding to a predetermined value of which size of a negative benefit decreases as the block frequency of the low-cut shelving filter and the volume of the low-cut shelving filter gradually decrease.

For example, in case the characteristic value of the speaker 110 is '0x000000A3,' the index value of the first parameter is 3, and thus the minimum volume level among the plurality of volume levels of the filter information corresponding to the characteristic value may be 50. As the second parameter is A, and the third parameter is 0, the block frequency of the low-cut shelving filter may be 250 Hz, and the decreased amount of the size of the negative benefit may be 0.15 dBSPL as the volume level gradually decreases.

Figure 6:
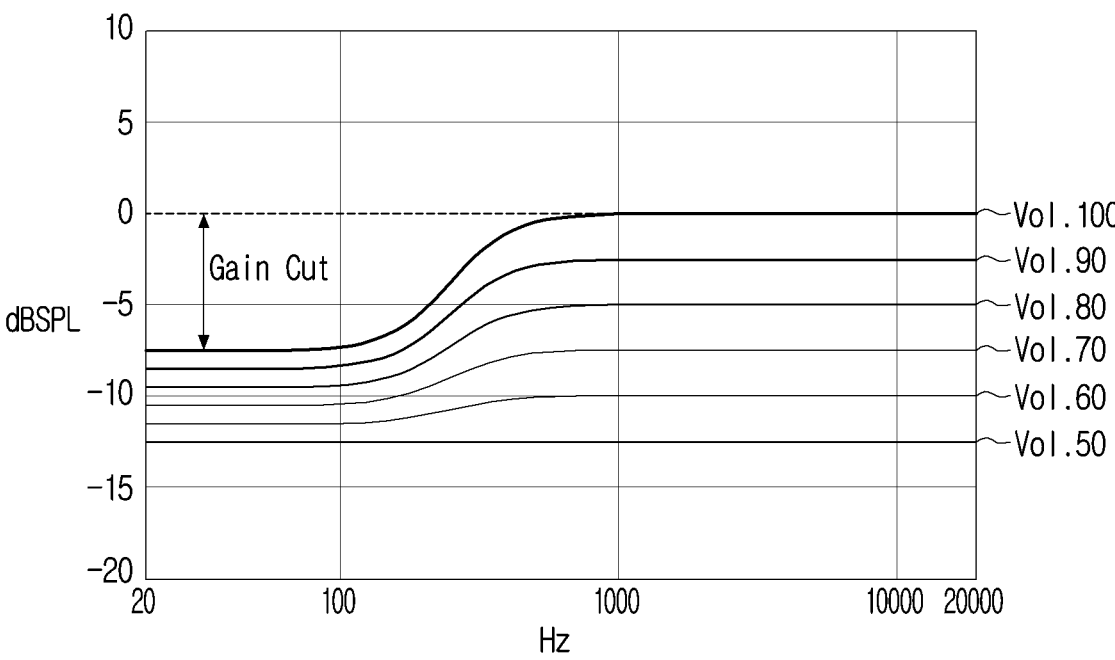
FIG. 6 is a graph illustrating filters for each of a plurality of volume levels according to various embodiments.

Accordingly, as illustrated in FIG. 6, filters for each of the plurality of volume levels may be designed based on filter information corresponding to the characteristic value '0x000000A3' of the speaker 110. For example, a low-cut shelving filter wherein the minimum volume level at which the filter is applied is 50, the block frequency is 250 Hz, and the decreased amount of the size of the negative benefit is 0.15 dBSPL as the volume level gradually decreases may be designed.

As described above, the electronic device 100 according to an embodiment of the disclosure may design a filter based on the characteristic value of the speaker 110 having an index value corresponding to information on the designed filter, and thus the operation amount of the processor 130 can be reduced or the use amount of the memory 120 can be reduced compared to a case of designing a filter by receiving information for designing a specific filter in real time.

The processor 130 may set a filter based on filter information corresponding to the volume level of the electronic device 100 among the obtained filter information.

For example, the processor 130 may design a filter using a filter coefficient of the filter information corresponding to the volume level of the electronic device 100 among the obtained filter information, and set the designed filter as a filter for performing signal processing.

The volume level of the electronic device 100 may be a volume level that was set based on a user instruction. For this, the electronic device 100 may include a user inputter. The processor 130 may receive a user instruction for setting a volume level through the user inputter, and set a volume level corresponding to the received user instruction as the volume level of the electronic device 100.

The processor 130 may perform signal processing on an audio signal using the set filter. Then, the processor 130 may control the speaker 110 to output the processed audio signal.

According to the characteristics of the speaker 110, audio signals of all frequency bands may be output without a limitation in 'a low volume level section' which is a section lower than a predetermined volume level, but in 'a high volume level' which is a section higher than or equal to the predetermined volume level, audio signals of specific frequency bands may not be output.

Accordingly, in case the volume level of the electronic device 100 is higher than or equal to the predetermined volume, the processor 130 may output the processed audio signal through the speaker, and in case the volume level of the electronic device 100 is lower than the predetermined volume, the processor 130 may output the audio signal through the speaker without signal processing using the filter.

In this case, the predetermined level may be a value that was set according to the characteristics of the speaker 110. Specifically, according to the characteristics of the speaker 110, a low volume level section wherein signals of all frequency bands can be output without a limitation may vary, and thus the predetermined level may be set from the manufacturing step of the electronic device 100 according to the characteristics of the speaker 110 and stored in the memory 120, or set from the user and stored in the memory 120.

As described above, the electronic device 100 according to an embodiment of the disclosure may output an audio signal as it is through the speaker 110 without performing signal processing in a low volume level section wherein distortion of the sound quality set according to the characteristics of the speaker 110 does not occur, and may output an audio signal through the speaker 110 by performing signal processing in a high volume level section wherein distortion of the sound quality set according to the characteristics of the speaker 110 may occur.

Accordingly, the electronic device 100 according to an embodiment of the disclosure can output an audio signal wherein there is no distortion of the sound quality, and at the same time, for which the performance of the speaker 110 has been exerted fully through the speaker 110, and can thus provide a better listening experience to the user of the electronic device 100.

Figure 7:
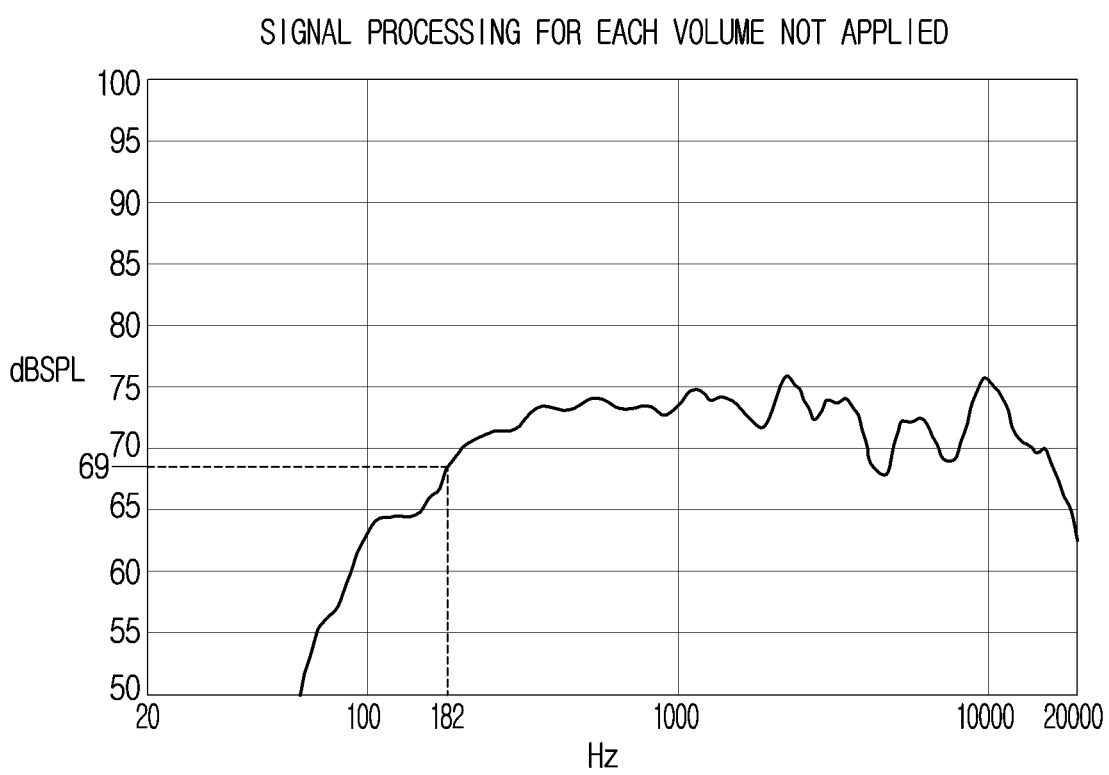
FIG. 7 is a graph illustrating a spectrum of an audio signal output through a speaker at a low volume level according to various embodiments.
Figure 8:
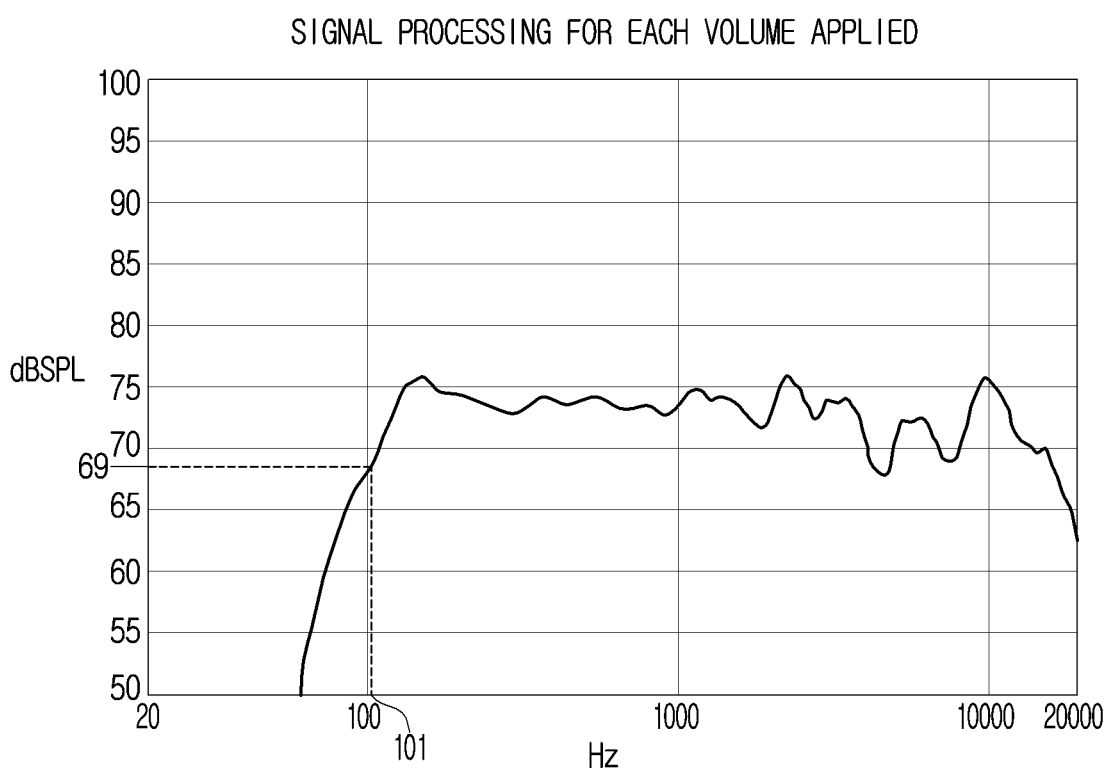
FIG. 8 is a graph illustrating a spectrum of an audio signal output through a speaker at a low volume level according to various embodiments.

FIG. 7 and FIG. 8 are graphs illustrating a spectrum of an audio signal output through a speaker at a low volume level according to various embodiments. It is assumed that a filter that was used in signal processing is a low-cut shelving filter. Also, it is assumed that the speaker 110 may output an audio signal having a size corresponding to a low volume level in all frequency bands.

The spectrum in FIG. 7 is a spectrum of an audio signal wherein signal processing for the audio signal was performed in a low volume level section, and the audio signal was output through the speaker 110.

In this case, the frequency band of an audio signal which has a size smaller than 69 dBSPL that is lower than the reference sound pressure 75 dBSPL by 6 dB may be 0 Hz or higher and lower than 182 Hz.

The reference sound pressure may refer, for example, to the size of an audio signal corresponding to the volume level of the electronic device 100 that needs to be output from the speaker 110 to provide an optimized sound quality. That is, in a low volume level, in case an audio signal having a size of 75 dBSPL is not output through the speaker 110, it can be deemed that the sound quality was not optimized.

The spectrum in FIG. 8 is a spectrum of an audio signal wherein signal processing for the audio signal was not performed in a low volume level section, and the audio signal was output through the speaker 110.

In this case, the frequency band of an audio signal which has a size smaller than 69 dBSPL that is lower than the reference sound pressure 75 dBSPL by 6 dB may be 0 Hz or higher and lower than 101 Hz.

As described above, in case signal processing is performed uniformly in all volume level sections, signal processing is performed also in a case wherein signal processing is not necessary, and thus a frequency band of an audio signal that does not have a size corresponding to the volume level of the electronic device 100 increases among audio signals output through the speaker 110. This may lead to failure to provide an optimized sound quality to the user.

In case an audio signal is output through the speaker 110 while signal processing is not performed in a low volume level section wherein signal processing is not necessary, a frequency band of an audio signal that does not have a size corresponding to the volume level of the electronic device 100 does not increase among audio signals output through the speaker 110, and thus an audio signal of a more optimized sound quality can be provided to the user.

Figure 9:
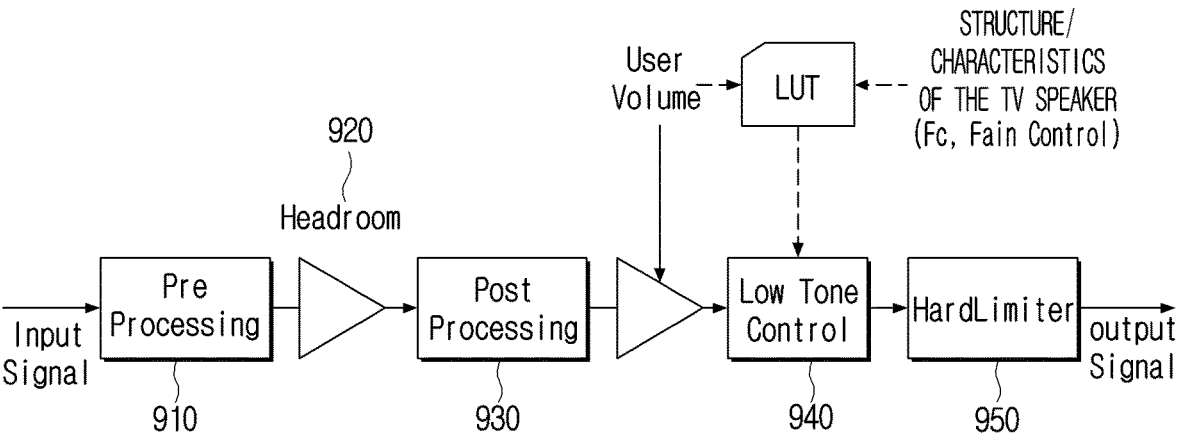
FIG. 9 is a diagram illustrating an example audio signal processing system according to various embodiments.

FIG. 9 is a diagram illustrating an example audio signal processing system according to various embodiments.

An audio signal processing system may include a pre processing unit (e.g., including circuitry) 910, a headroom 920, a post processing unit (e.g., including circuitry) 930, a low tone control (e.g., including circuitry) 940, and a hard limiter (e.g., including circuitry) 950. In this case, each component of the audio signal processing system may be electrically connected with the processor 130, and may operate or be controlled according to an instruction of the processor 130. Also, some or all of each component of the audio signal processing system may be components included in the processor 130.

The pre processing unit 910 may include various circuitry and/or executable program instructions and decode an encoded audio signal. Accordingly, the encoded audio signal may be input into the pre processing unit 910 and decoded, and the decoded audio signal may be transmitted to the headroom 920.

The headroom 920 may include various circuitry and/or executable program instructions and reduce the size of an audio signal by a predetermined value in all frequency bands for preventing and/or reducing an overflow and an underflow of the audio signal that may occur in a signal processing process.

Accordingly, the size of an audio signal input into the headroom 920 may be reduced by the predetermined value in all frequency bands, and transmitted to the post processing unit 930.

The post processing unit 930 may include various circuitry and/or executable program instructions and perform various kinds of signal processing on an audio signal.

As an example, the post processing unit 930 may perform ton mapping for an input audio signal based on human auditory characteristics and the characteristics of the speakers 110 such as the locations wherein the speakers 110 are mounted on the electronic device 100 and the number of the speakers 110, etc.

As another example, the post processing unit 930 may perform signal processing for an input audio signal such that the audio signal output through the speaker 110 can have a specific sound effect.

Accordingly, various kinds of signal processing may be performed for an audio signal input into the post processing unit 930, and the audio signal may be transmitted to the low tone control 940. In this case, the size of the audio signal for which signal processing was performed by the post processing unit 930 may be changed to correspond to the volume level of the electronic device 100 in the entire frequency bands according to the volume level of the electronic device 100 as the audio signal is transmitted to the low tone control 940.

The low tone control 940 may include various circuitry and/or executable program instructions and reduce the size of an audio signal of a specific frequency band among audio signals based on the volume level of the electronic device 100 and the characteristic values of the speaker 110. For this, the low tone control 940 may include a low-cut shelving filter.

For example, the low tone control 940 may obtain filter information for each of the plurality of volume levels corresponding to the characteristic values of the speaker 110 among the filter information stored in the memory 120 based on the characteristic values of the speaker 110.

The low tone control 940 may set a filter based on the filter information corresponding to the volume level of the electronic device 100 among the obtained filter information, and perform signal processing on an input audio signal using the set filter.

As the signal processing of the low tone control 940 is identical to the signal processing of the processor 130 described above, detailed explanation may not be repeated here.

Accordingly, the size of an audio signal of a specific frequency band among the audio signals input into the low tone control 940 may be reduced, and the audio signal may be transmitted to the hard limiter 950.

The hard limiter 950 may perform signal processing such that the audio signal matches the specification required by the amplifier.

For example, in case the audio signal received from the low tone control 940 does not match the specification required by the amplifier, the hard limiter 950 may perform signal processing on the audio signal such that the audio signal matches the specification required by the amplifier, and transmit the audio signal to the amplifier.

In case the audio signal received from the low tone control 940 matches the specification required by the amplifier, the hard limiter 950 may transmit the audio signal to the amplifier without performing signal processing.

As described above, the audio signal processing system according to an embodiment of the disclosure may perform signal processing on an audio signal using a filter that was set based on the characteristics of the speaker 110 through the low tone control 940 while the audio signal input into the electronic device 100 is being output through the speaker 110. Accordingly, the audio signal processing system can output an audio signal which has an optimized sound quality for which the performance of the speaker 110 has been exerted fully, and at the same time, wherein there is no distortion of the sound quality through the speaker 110.

Figure 10:
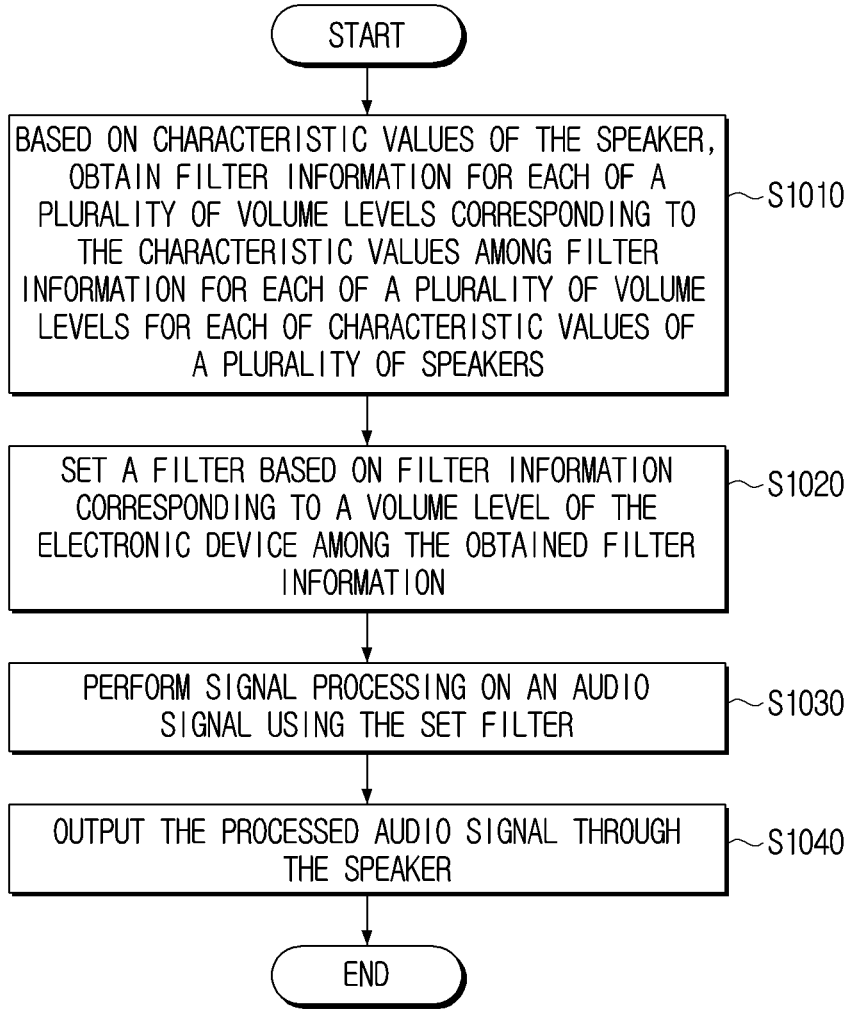
FIG. 10 is a flowchart illustrating an example method of controlling an electronic device according various embodiments.

FIG. 10 is a flowchart illustrating an example method of controlling an electronic device according to various embodiments.

Based on characteristic values of the speaker, filter information for each of a plurality of volume levels corresponding to the characteristic values among filter information for each of a plurality of volume levels for each of characteristic values of a plurality of speakers is obtained in operation S1010.

A filter is set based on filter information corresponding to a volume level of the electronic device among the obtained filter information in operation S1020.

Signal processing is performed on an audio signal using the set filter in operation S1030.

The processed audio signal is output through the speaker in operation S1040.

In operation S1040, based on the volume level of the electronic device being higher than or equal to a predetermined level, the processed audio signal may be output through the speaker, and based on the volume level of the electronic device being lower than the predetermined level, the audio signal may be output through the speaker without signal processing using the filter.

The characteristic values of the speaker may include index values for each of a plurality of parameters, and the index values for each of the parameters may be determined based on the characteristics of the speaker.

In this case, the plurality of parameters may include a parameter for a range of the plurality of volume levels corresponding to the filter information, a parameter for a benefit of the filter, and a parameter for a block frequency of the filter.

The filter may include a low-cut shelving filter.

In this case, a size of a negative benefit of the low-cut shelving filter may decrease by a predetermined value as the volume level of the electronic device gradually decreases.

The filter information for each of the plurality of volume levels may include information on filter coefficients corresponding to each of the volume levels.

As described above, in a method of controlling an electronic device according to an embodiment of the disclosure, signal processing on an audio signal can be performed by setting a filter differently for each characteristic of a speaker, and thus an audio signal which has an optimized sound quality for which the performance of the speaker has been exerted fully, and at the same time, wherein there is no distortion of the sound quality can be output through the speaker.

Figure 11:
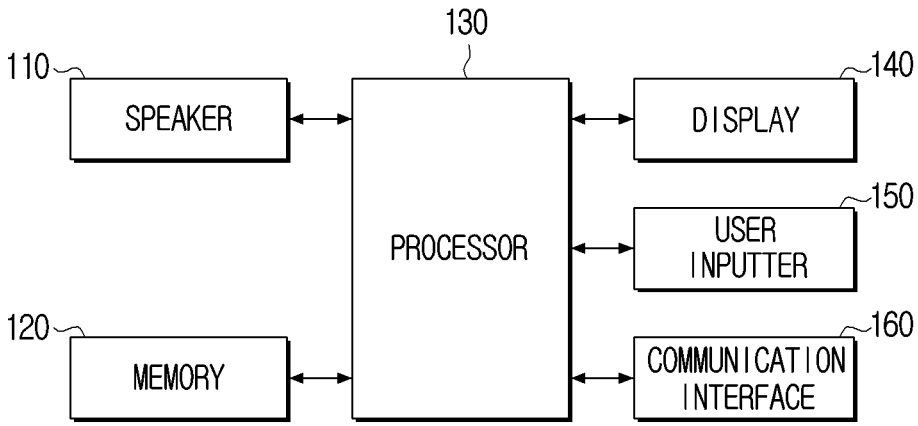
FIG. 11 is a block diagram illustrating an example configuration of an electronic device according to various embodiments.

FIG. 11 is a block diagram illustrating an example configuration of an electronic device according to various embodiments.

Referring to FIG. 11, an electronic device 100 may include a speaker 110, a memory 120, a processor (e.g., including processing circuitry) 130, a display 140, a user inputter (e.g., including various circuitry) 150, and a communication interface (e.g., including communication circuitry) 160. The components illustrated in FIG. 11 are merely an example, and it will be apparent that at least some components can be omitted or other components can be added depending on embodiments.

As the speaker 110, the memory 120, and the processor 130 were explained in FIG. 1 to FIG. 10, detailed explanation regarding overlapping parts may not be repeated here.

The display 140 is a component that can display a screen. For example, the processor 130 may display various contents through the display 140.

The processor 130 may include various processing circuitry and output an audio signal of a content displayed through the display 140 through the speaker 110. In this case, signal processing may be performed on the audio signal of the content based on the characteristic values of the speaker 110, and the audio signal may be output through the speaker 110. For this, the display 140 may be implemented as displays in various types such as an LCD, LED, or OLED, etc.

The user inputter 150 is a component for receiving inputs of various user instructions. For example, the processor 130 may receive an input of a user instruction for setting the volume level of the electronic device 100 through the user inputter 150. The user inputter 150 may include a button, a touch panel, and a remote control signal receiver, etc.

The user inputter 150 may include a microphone, and accordingly, the processor 130 may identify a user instruction for setting the volume level of the electronic device 100 based on a user voice input through the microphone.

The communication interface 160 may include various communication circuitry and perform communication with an external electronic device. For example, the processor 130 may receive an audio signal from an external device through the communication interface 160, and perform signal processing for the received audio signal, and output the audio signal through the speaker 110. For this, the communication interface 160 may perform communication with various external devices through a wireless communication method such as Bluetooth (BT), Bluetooth Low Energy (BLE), Wireless Fidelity (WI-FI), Zigbee, etc., or an infrared (IR) communication method.

According to the various embodiments of the disclosure, signal processing is performed on an audio signal based on the characteristics of the speaker, and thus an audio signal which has an optimized sound quality for which the performance of the speaker has been exerted fully, and at the same time, wherein there is no distortion of the sound quality can be output, and accordingly, a better listening experience can be provided to the user.

According to an embodiment of the disclosure, the aforementioned various embodiments may be implemented as software including instructions stored in machine-readable storage media, which can be read by machines (e.g.: computers). The machines may refer to devices that call instructions stored in a storage medium, and can operate according to the called instructions, and the devices may include a device according to the aforementioned embodiments. In case an instruction is executed by a processor, the processor may perform a function corresponding to the instruction by itself, or using other components under its control. An instruction may include a code that is generated or executed by a compiler or an interpreter. A storage medium that is readable by machines may be provided in the form of a non-transitory storage medium. The 'non-transitory' storage medium is a tangible device, and may not include signals (e.g.: electromagnetic waves), and the term does not distinguish a case wherein data is stored in a storage medium semi-permanently and a case wherein data is stored temporarily. For example, 'a non-transitory storage medium' may include a buffer wherein data is temporarily stored.

According to an embodiment, the methods according to the aforementioned various embodiments may be provided while being included in a computer program product. A computer program product refers to a product, and it can be traded between a seller and a buyer. A computer program product may be distributed in the form of a storage medium that is readable by machines (e.g.: a compact disc read only memory (CD-ROM)), or may be distributed directly between two user devices (e.g.: smartphones), and distributed on-line (e.g.: download or upload) through an application store (e.g.: Play Store™). In the case of on-line distribution, at least a portion of a computer program product (e.g.: a downloadable app) may be stored in a storage medium such as the server of the manufacturer, the server of the application store, and the memory of the relay server at least temporarily, or may be generated temporarily.

In addition, while various example embodiments of the disclosure have been illustrated and described, it will be understood that the disclosure is not limited to the afore-mentioned specific embodiments, and it will be apparent to those skilled in the art that various modifications can be made, without departing from the gist of the disclosure, including appended claims and their equivalents. It will also be understood that any of the embodiment(s) described herein may be used in conjunction with any other embodi-ment(s) described herein.

What is claimed is:

1. An electronic device comprising:
a speaker;
a memory storing filter information for each of a plurality of volume levels for each of characteristic values of a plurality of speakers; and
at least one processor, comprising processing circuitry, individually and/or collectively, configured to:
obtain filter information for each of the plurality of volume levels corresponding to the characteristic val-ues of the speaker among the stored filter information based on the characteristic values of the speaker;
set a filter based on filter information corresponding to a volume level of the electronic device among the obtained filter information;
perform signal processing on an audio signal using the set filter; and
control the speaker to output the processed audio signal.

2. The electronic device of claim 1,
wherein at least one processor, individually and/or col-lectively, is configured to:
based on the volume level of the electronic device being greater than or equal to a specified level, output the processed audio signal through the speaker, and
based on the volume level of the electronic device being less than the specified level, output the audio signal through the speaker without signal processing using the filter.

3. The electronic device of claim 1,
wherein the characteristic values of the speaker include index values for each of a plurality of parameters, and
the index values for each of the parameters are determined based on the characteristics of the speaker.

4. The electronic device of claim 3,
wherein the plurality of parameters comprise:
a parameter for a range of the plurality of volume levels corresponding to the filter information, a parameter for a benefit of the filter, and a parameter for a block frequency of the filter.

5. The electronic device of claim 1,
wherein the filter comprises:
a low-cut shelving filter.

6. The electronic device of claim 5,
wherein a size of a negative benefit of the low-cut shelving filter decreases by a specified value as the volume level of the electronic device decreases.

7. The electronic device of claim 1,
wherein the filter information for each of the plurality of volume levels comprises:
information on filter coefficients corresponding to each of the volume levels.

8. A method of controlling an electronic device compris-ing a speaker, the method comprising:
based on characteristic values of the speaker, obtaining filter information for each of a plurality of volume levels corresponding to the characteristic values among filter information for each of a plurality of volume levels for each of characteristic values of a plurality of speakers;
setting a filter based on filter information corresponding to a volume level of the electronic device among the obtained filter information;
performing signal processing on an audio signal using the set filter; and
outputting the processed audio signal through the speaker.

9. The method of claim 8,
wherein the outputting comprises:
based on the volume level of the electronic device being greater than or equal to a specified level, outputting the processed audio signal through the speaker; and
based on the volume level of the electronic device being less than the specified level, outputting the audio signal through the speaker without signal processing using the filter.

10. The method of claim 8,
wherein the characteristic values of the speaker include index values for each of a plurality of parameters, and
the index values for each of the parameters are determined based on the characteristics of the speaker.

11. The method of claim 10,
wherein the plurality of parameters comprise:
a parameter for a range of the plurality of volume levels corresponding to the filter information, a parameter for a benefit of the filter, and a parameter for a block frequency of the filter.

12. The method of claim 8,
wherein the filter comprises:
a low-cut shelving filter.

13. The method of claim 12,
wherein a size of a negative benefit of the low-cut shelving filter decreases by a specified value as the volume level of the electronic device decreases.

14. The method of claim 8,
wherein the filter information for each of the plurality of volume levels comprises:
information on filter coefficients corresponding to each of the volume levels.

15. A non-transitory computer readable recording medium storing computer instructions that cause an electronic device comprising a speaker to perform an operation when executed by at least one processor of the electronic device, wherein the operation comprises;
based on characteristic values of the speaker, obtaining filter information for each of a plurality of volume levels corresponding to the characteristic values among filter information for each of a plurality of volume levels for each of characteristic values of a plurality of speakers;
setting a filter based on filter information corresponding to a volume level of the electronic device among the obtained filter information;
performing signal processing on an audio signal using the set filter; and
outputting the processed audio signal through the speaker.

16. The medium of claim 15,
wherein the outputting comprises:
based on the volume level of the electronic device being greater than or equal to a specified level, outputting the processed audio signal through the speaker; and
based on the volume level of the electronic device being less than the specified level, outputting the audio signal through the speaker without signal processing using the filter.

17. The medium of claim 15, wherein the characteristic values of the speaker include index values for each of a plurality of parameters, and the index values for each of the parameters are determined based on the characteristics of the speaker.

18. The medium of claim 17, wherein the plurality of parameters comprise:

a parameter for a range of the plurality of volume levels corresponding to the filter information, a parameter for a benefit of the filter, and a parameter for a block frequency of the filter.

19. The medium of claim 15, wherein the filter comprises:

a low-cut shelving filter.

20. The medium of claim 19, wherein a size of a negative benefit of the low-cut shelving filter decreases by a specified value as the volume level of the electronic device decreases.

\* \* \* \* \*